US010211690B2

(12) United States Patent
Laldin

(10) Patent No.: US 10,211,690 B2
(45) Date of Patent: Feb. 19, 2019

(54) IPM MACHINE WITH SPECIALIZED ROTOR FOR AUTOMOTIVE ELECTRIC VEHICLES

(71) Applicant: Faraday & Future Inc., Gardena, CA (US)

(72) Inventor: Omar Abdul Rahman Laldin, Hermosa Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 230 days.

(21) Appl. No.: 15/141,636

(22) Filed: Apr. 28, 2016

(65) Prior Publication Data

US 2017/0317540 A1 Nov. 2, 2017

(51) Int. Cl.
*H02K 1/27* (2006.01)
*H02K 21/14* (2006.01)

(52) U.S. Cl.
CPC ......... *H02K 1/2706* (2013.01); *H02K 1/2766* (2013.01); *H02K 21/14* (2013.01); *H02K 2213/03* (2013.01)

(58) Field of Classification Search
CPC ........ H02K 1/27; H02K 1/2706; H02K 1/274; H02K 1/2753; H02K 1/276; H02K 1/2766; H02K 2213/03
USPC ............ 310/156.38, 156.53, 156.56, 156.57, 310/154.22, 156.45
See application file for complete search history.

(56) References Cited

U.S. PATENT DOCUMENTS

| 4,649,331 | A | 3/1987 | Jahns |
| 6,034,460 | A * | 3/2000 | Tajima ................. B60L 15/025 |
| | | | 310/156.53 |
| 6,486,581 | B2 | 11/2002 | Miyashita |
| 7,459,821 | B2 | 12/2008 | Ho Cheong et al. |
| 7,851,958 | B2 | 12/2010 | Cai |
| 2007/0063607 | A1* | 3/2007 | Hattori ................. H02K 1/2766 |
| | | | 310/156.53 |
| 2012/0139465 | A1 | 6/2012 | Harianto |
| 2013/0169098 | A1* | 7/2013 | Chamberlin .......... H02K 1/272 |
| | | | 310/156.08 |

OTHER PUBLICATIONS

Laldin, O, et al., "An Analytical Design Model for Hybrid Salient-Pole Machines," IEEE Electric Machines & Drives Conference, (May 2013).
Laldin, O., et al, "An Analytical Design Model for Wound Rotor Synchronous Machines," IEEE Electric Ship Technologies Symposium (Apr. 2013).

* cited by examiner

*Primary Examiner* — Bernard Rojas
*Assistant Examiner* — Ahmed Elnakib
(74) *Attorney, Agent, or Firm* — Knobbe Martens Olson & Bear LLP

(57) ABSTRACT

Certain aspects relate to designs for an interior permanent magnet (IPM) electrical machine rotor and magnets having a double layer split interior magnet configuration. Compared to existing designs, the disclosed rotor design has an increased amount of magnet material, more elongated and thinner slots, a wider angle for the "nested-v" configuration, and wider branches between layers of magnets, resulting in an improved power density.

23 Claims, 8 Drawing Sheets

IPM MACHINE WITH SPECIALIZED ROTOR FOR AUTOMOTIVE ELECTRIC VEHICLES

TECHNICAL FIELD

The systems and methods disclosed herein are directed to interior permanent magnet machines, and, more particularly, to interior permanent magnet machines having improved performance.

BACKGROUND

In recent years, high efficiency electric motors have become desirable to meet the challenges of providing power without the usage of fossil fuel sources, for example in hybrid and electric vehicles. Interior permanent magnet (IPM) motors have become popular due to their high efficiency performance, as an IPM is an increasingly efficient synchronous motor due to advances in high-energy permanent magnet technology, smart inverters, and digital controllers.

The rotor is rotatable within a stator which includes multiple windings to produce a rotating magnetic field in the frame of reference of the stator. IPM electric machines have magnets built into the interior of the rotor, and each magnetic pole on the rotor is conventionally created by putting permanent magnet material into slots formed in the laminated stack of the rotor. Such slots are typically not completely filled with magnetic material, instead being designed to hold a magnet in the center with voids or non-magnetic material at two opposite ends of the slot. A nested v-shaped slot configuration is known from U.S. Pat. No. 7,851,958 and U.S. Pat. No. 7,459,821, however maximizing power density of such a topology is a concern in motor design.

SUMMARY

The electrical machine rotor designs disclosed herein have several features, no single one of which is solely responsible for its desirable attributes. Without limiting the scope as expressed by the claims that follow, the more prominent features of the design will now be discussed briefly. After considering this discussion, and particularly after reading the section entitled "Detailed Description" one will understand how the features of the rotor designs provide several advantages over traditional systems and methods.

One aspect relates to an interior permanent magnet electrical machine comprising a stator comprising a plurality of stator teeth separated by a plurality of gaps; a rotor positioned within the stator, the rotor comprising a rotor body comprised of magnetically permeable material configured for conducting magnetic flux, a plurality of magnet slot clusters, each comprising a plurality of magnet slots formed in the rotor body, the plurality of magnet slots arranged in a first v-shaped configuration nested within a second v-shaped configuration, wherein a d-axis of the rotor passes through a line of symmetry of the first v-shaped configuration and of the second v-shaped configuration, a trapezoidal slot formed in the rotor body in a middle portion of the second v-shaped configuration, a plurality of branches formed in the rotor body, each branch of the plurality of branches positioned between adjacent magnet slots, the adjacent magnet slots comprising a first magnet slot of the first v-shaped configuration and a second magnet slot of the second v-shaped configuration, wherein a depth of each branch is 32%-40% of a first distance perpendicularly spanning the depth of the first magnet slot, the second magnet slot, and the branch, and a plurality of triangular slots formed in the rotor body, each of the plurality of triangular slots positioned between adjacent magnet slot clusters; and a plurality of permanent magnets, wherein each of the plurality of magnet slots in each of the plurality of magnet slot clusters contains one of the plurality of permanent magnets; wherein a first magnet of the plurality of permanent magnets in the first magnet slot of the first v-shaped configuration of one of the plurality of magnet slot clusters has a width to depth ratio of 1.5 to 2, and wherein the width of the first magnet is at least 55% of a second distance spanning from the d-axis to an outer circumference of the rotor along a longitudinal axis of the first magnet; and wherein a second magnet of the plurality of magnetized permanent magnets in the second magnet slot of the second v-shaped configuration of the one of the plurality of magnet slot clusters has a width to depth ratio of 3 to 3.5, and wherein the width of the second magnet is at least 45% of a third distance spanning from the d-axis to the outer circumference of the rotor along a longitudinal axis of the second magnet.

In some embodiments, each magnet of the plurality of magnetized permanent magnets can be positioned such that a longitudinal axis of the magnet forms an angle of 0.94 radians relative to the d-axis. Each magnet slot of the plurality of magnet slots can include a magnetically inert material filling ends of the magnet slot on either side of the enclosed one of the plurality of magnetized permanent magnets. Each magnet slot of the plurality of magnet slots can be angled such that a first end of the magnet slot is positioned closer to the stator than a second end of the magnet slot, and the rotor can comprise a plurality of additional branches each formed between an outer diameter of the rotor body and the first end of a corresponding one of the plurality of the magnet slots, each of the plurality of additional branches having a thickness between 4.5% and 7.6% of a distance passing through a center of an adjacent slot of the plurality of magnet slots between a d-axis and an outer diameter of the rotor.

In some embodiments, the rotor body can further comprise an outer rotor branch between an outer diameter of the rotor and an edge of the first magnet slot adjacent the outer diameter of the rotor; and an inner rotor branch between a side of a triangular slot of the plurality of triangular slots adjacent the second magnet slot and an edge of the second magnet slot adjacent the triangular slot. A thickness of the outer rotor branch can be 14.5%-22% of a second distance perpendicularly spanning the depth of the first magnet slot, the second magnet slot, the branch, the outer rotor branch, and the inner rotor branch. A thickness of the inner rotor branch can be 17%-26% of a second distance perpendicularly spanning the depth of the first magnet slot, the second magnet slot, the branch, the outer rotor branch, and the inner rotor branch.

Each triangular slot and each trapezoidal slot can be filled with a magnetically inert material. The plurality of magnet slot clusters can comprise ten magnet slot clusters.

In some embodiments, an outer diameter of the rotor can be substantially equal to 186.419 mm. A cross-sectional area of the first magnet calculated by the width of the first magnet multiplied by the depth of the first magnet is substantially equal to 51 mm2. A cross-sectional area of the second magnet calculated by the width of the second magnet multiplied by the depth of the second magnet can be substantially equal to 93 mm2. Each of the plurality of triangular slots can comprise an isosceles triangle having a height of 28.5% of a depth of the rotor.

Another aspect relates to an interior permanent magnet electrical machine comprising a stator comprising a plurality of stator teeth separated by a plurality of gaps; a rotor positioned within the stator, the rotor comprising a rotor body comprised of magnetically permeable material configured for conducting magnetic flux, a plurality of magnet slot clusters, each comprising a plurality of magnet slots formed in the rotor body, the plurality of magnet slots arranged in a first v-shaped configuration nested within a second v-shaped configuration, wherein a d-axis of the rotor passes through a line of symmetry of the first v-shaped configuration and of the second v-shaped configuration, a plurality of branches formed in the rotor body, each branch of the plurality of branches positioned between adjacent magnet slots, the adjacent magnet slots comprising a first magnet slot of the first v-shaped configuration and a second magnet slot the second v-shaped configuration, wherein a thickness of each branch is 32%-40% of a first distance spanning the first magnet slot and the second magnet slot; and a plurality of magnetized permanent magnets, wherein each of the plurality of magnet slots in each of the plurality of magnet slot clusters contains one of the plurality of magnetized permanent magnets, wherein each magnet of the plurality of magnetized permanent magnets is positioned such that a longitudinal axis of the magnet forms an angle of 0.8 to 1.0 radians relative to the d-axis.

In some embodiments, each magnet of the plurality of magnetized permanent magnets can be positioned such that the longitudinal axis of the magnet forms an angle of 0.94 radians relative to the d-axis. The interior permanent magnet electrical machine can further comprise, between each of the plurality of magnet slot clusters, one of a plurality of triangular air gaps formed in the rotor body.

A first magnet of the plurality of magnetized permanent magnets in the first magnet slot of the first v-shaped configuration of one of the plurality of magnet slot clusters can have a depth to width ratio of 1.7, and the depth of the first magnet can be at least 55% of a second distance spanning from the d-axis to an outer circumference of the rotor along a longitudinal axis of the first magnet. A second magnet of the plurality of magnetized permanent magnets in the second magnet slot of the second v-shaped configuration of the one of the plurality of magnet slot clusters can have a depth to width ratio of 3.3, and the depth of the second magnet can be at least 45% of a third distance spanning from the d-axis to the outer circumference of the rotor along a longitudinal axis of the second magnet.

An outer diameter of the rotor can be substantially equal to 186.419 mm. A cross-sectional area of the first magnet calculated by the width of the first magnet multiplied by the depth of the first magnet can be approximately 51 mm2, and wherein a cross-sectional area of the second magnet calculated by the width of the second magnet multiplied by the depth of the second magnet can be substantially equal to 93 mm2. Each of the plurality of magnet slot clusters can further comprise a trapezoidal slot formed in the rotor body in a middle portion of the second v-shaped configuration.

Each magnet slot of the plurality of magnet slots can be angled such that a first end of the magnet is positioned closer to the stator than a second end of the magnet. First ends of magnet slots in the first v-shaped configuration of the one of the plurality of magnet slot clusters can be aligned with corresponding gaps of the plurality of gaps when first ends of magnet slots in the second v-shaped configuration of the one of the plurality of magnet slot clusters are aligned with corresponding teeth of the plurality of stator teeth.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1:
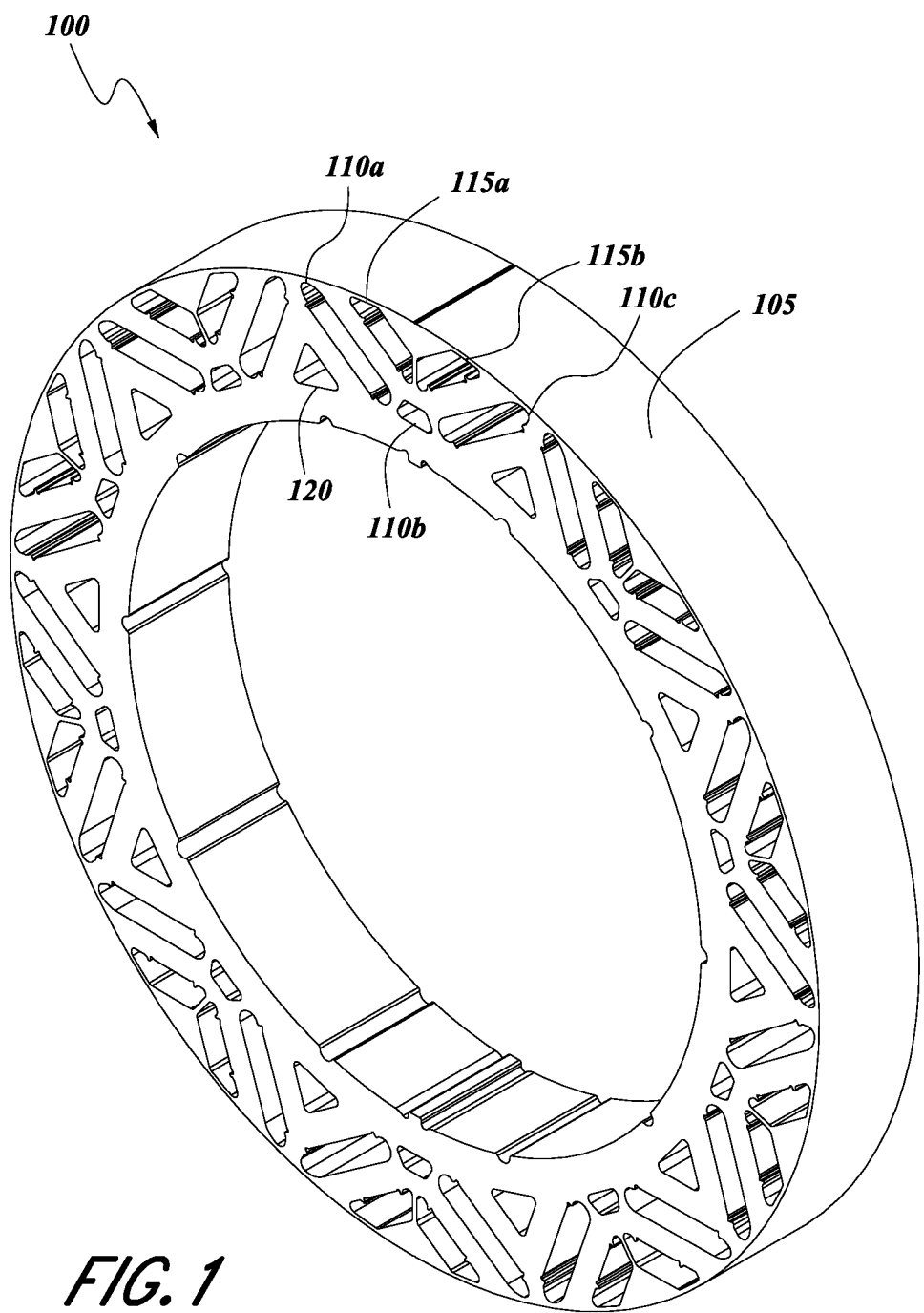
FIG. 1 illustrates a perspective view of one example substack of an interior permanent magnet (IPM) rotor having an improved design as described herein.

Embodiments of the disclosure relate to a rotor steel design for improved performance of an interior permanent magnet (IPM) electrical machine. As used herein, "topology" refers to the arrangement of the different components of the IPM electrical machine, while "design" refers to the selection of specific dimensions, shapes, and positions of the components as well as the spatial relationships between such components of the topology. For example, the components of the topology can be permanent magnets, air gaps in the rotor, magnet slots in the rotor, filler material in the rotor, and dimensions of portions of the rotor.

In general, this disclosure is related to design of a rotor and magnets for interior permanent magnet machines resulting in improved machine performance, for example increased power density, lower rotor mass, and reduced detrimental slotting effects. The rotor is the perhaps most critical design challenge for developing an IPM machine that will meet identified performance targets. In permanent magnet motor design, because the space in the rotor is limited, proper utilization of magnetic material is a key consideration for machine performance. Further, the design must consider centrifugal forces and mechanical stresses encountered during high-speed rotation. Dimensioning the magnets for proper aspect ratios at load conditions and at the same time designing the rotor to operate at optimum flux density level is a complex design consideration. Accordingly, attempts to improve the performance of IPM machines are typically associated with design of the rotor assembly and magnet placement such that it will result in improved performance. Aspects of the rotor design of the present disclosure relate to changes in both magnet shape and size as well as rotor steel design.

There are many complex mechanical, electro-magnetic, and thermal design issues relating to design of a high-speed, high-power-density IPM machine. For instance, at high speeds, rotor structural integrity and mechanical balance are critical design issues. As another example, the bridge of the rotor must operate in a saturated state even at zero stator current condition or a significant percentage of the permanent magnet flux is wasted. Further, hybrid electric vehicle (HEV) or electric vehicle (EV) traction motor applications tend to place restrictions on machine weight, size, source voltage, and maximum current, to name a few parameters. Thus, specific applications of an IPM can place restrictions on changes to the various design parameters.

Additionally, in many instances a change to the design of one rotor component both produces a benefit in one area of motor performance and has negative repercussions for other areas of motor performance. To illustrate one example, in IPM machines the permanent magnets are entirely encased in cavities or slots in the rotor body. Placement of these slots in close proximity to the edge of the rotor body near the air-gap between the rotor and the stator reduces flux leakage from the magnets. However, reducing sections of rotor material between the slots and air-gap provides limited structural integrity. To overcome this problem, further rotor strengthening can be accomplished, for example, through the use of either a high-strength metal cylindrical ring or a fiber-composite wrap for outer diameter rotor containment. As a consequence, these strengthening techniques increase the effective rotor-to-stator air gap and can adversely affect the machine performance. Thus, machine performance goals must be reconciled with conflicting design impacts, and it remains a significant challenge to balance all of the performance targets when changing the design of the components of the rotor topology.

The balance of a variety of rotor and magnet design parameters described herein produces at least four significant features to increase machine performance as compared to other IPM machines having similar topologies. These are: (1) the increased thickness of the branches of the rotor steel between adjacent parallel magnets results in an increase in the $L_q/L_d$ ratio, resulting in higher saliency torque of the rotor; (2) the increased magnet material results in increased flux-linkage and therefore torque due to the magnets; (3) the widening of the distance between outermost tips of the slots for the magnets results in the outermost tips of a first half of the magnet slots aligning with the stator teeth at different points in time than the outermost tips of a second half of the magnet slots, effectively reducing the detrimental effects due to slotting including core losses, cogging torque, noise, and reduced harmonics in the open-circuit voltage; and (4) the addition of triangular air gaps in the rotor steel between magnet clusters reduces the mass of the rotor. In combination, these design changes produce significant increases in power density, peak power, and maximum torque, as well as a decrease in rotor mass, as compared to IPM machines having similar topologies.

Widening of the distance between outermost tips of the slots for the magnets, thus widening the v-shape of the magnet slots, has a number of effects. First, widening the v-shape increases saliency by making it easier for magnetic flux to travel to/from the center of the q-axis. Second, widening the v-shape allows flux to disperse a bit more than if the v-shape is not widened. In a configuration without widened v-shape this flux would be severely saturating a stator tooth, especially when the tooth is lined up with d-axis center, as well as the triangular rotor portion between the v-shaped slots and the rotor perimeter (for reference, this rotor portion is indicated using "e" in FIG. 4). Third, widening the v-shape allows for wider magnets. However, widening the v-shape by too great an amount will reduce salience and allow for too much dispersion.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example IPM Rotor Design

Figure 2:
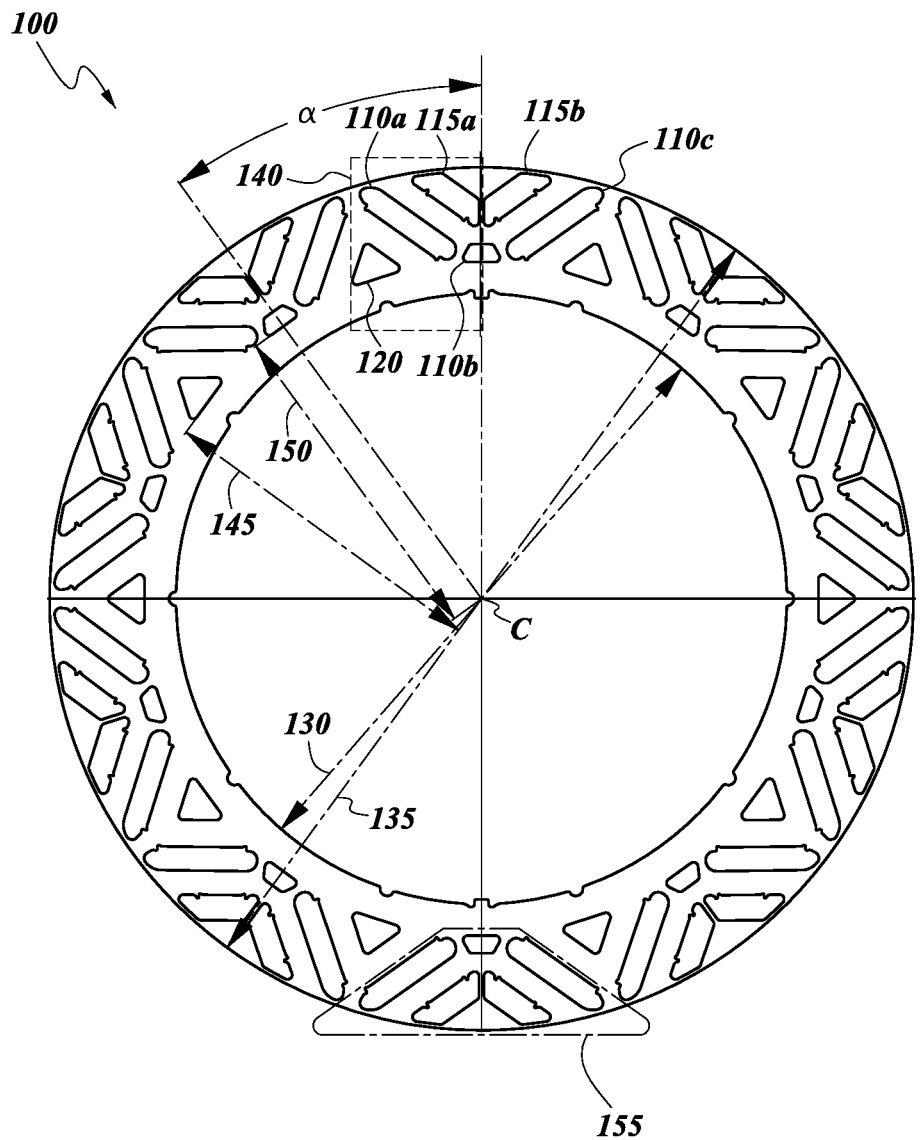
FIG. 2 illustrates a front view of the IPM rotor substack of FIG. 1.
Figure 3:
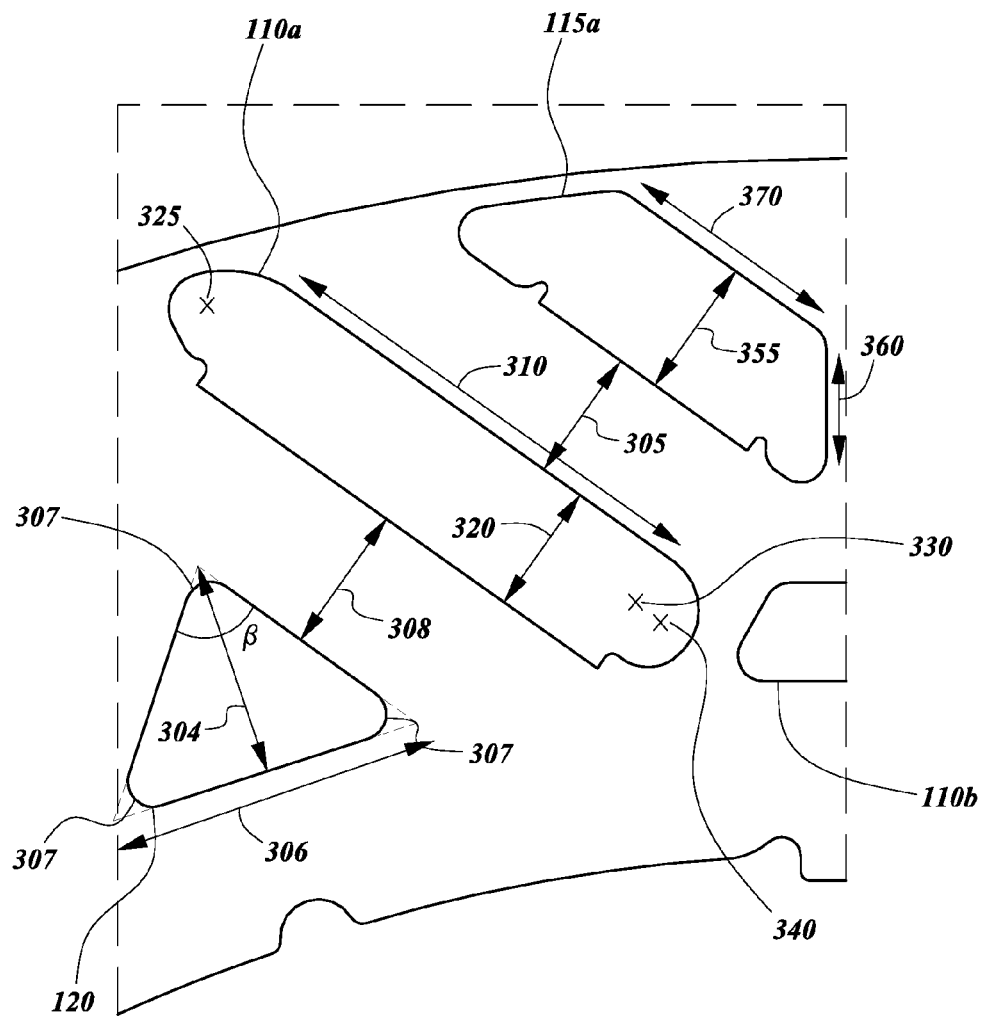
FIG. 3 illustrates a zoomed-in view of section 140 of the front view of FIG. 2.

FIG. 1 illustrates a perspective view of one example of a substack of an interior permanent magnet (IPM) rotor 100 having an improved design as described herein. A rotor can include one or more substacks as needed for the desired distance between end faces of the rotor. For example, the rotor can include five coaxial sub-stacks each a few degrees offset from adjacent sub-stacks. FIG. 2 illustrates a front view of the IPM rotor 100 of FIG. 1. FIG. 3 illustrates a zoomed-in view of section 140 of the front view of FIG. 2. Specific dimensions are discussed for the features of the rotor design below to provide one example implementation of the design, however it will be appreciated that the dimensions of the rotor features can be scaled together and still maintain the rotor design principles described herein.

With reference to FIGS. 1-3, the rotor 100 includes a rotor body 105 having ten poles. The pole span angle α measures substantially equal to 36°, and a pole can be considered as a region contained within a section such as shown in FIG. 6B. The rotor body 105 comprises a magnetically permeable material, for example sheets of electrical steel laminated into a stack. One example of suitable steel has a thickness, per lamination layer, of 0.30 mm, a yield strength of 430 Mpa, and a maximum loss of 15 W/kg at 400 Hz@1 T. Another example of suitable steel has a thickness, per lamination layer, of 0.35 mm, a yield strength of 427 Mpa, and a maximum loss of 18 W/kg at 400 Hz@1 T. Another example of suitable steel has a thickness, per lamination layer, of 0.25 mm, a yield strength of 350 Mpa, and a maximum loss of 14.5 W/kg at 400 Hz@1 T. Another example of suitable steel has a thickness, per lamination layer, of 0.356 mm, a yield strength of 358 Mpa, and a maximum loss of 1.45 W/lbs at 60 Hz@1.5 T.

In some embodiments, the rotor can include multiple sub-stacks offset a few degrees from one another. In the illustrated example, the outer diameter 135 of the rotor 105 can be 186.419 mm, and inner diameter 130 of the rotor body 105 can be 131.826 mm. As used herein, the term "substantially equal to" with reference to a dimension and a measurement refers to the dimension falling within the designated tolerances of the measurement.

Ten triangular slots 120 can be equally spaced apart around the rotor body 105. A base 306 of each triangular slot 120 can measure 12.496 mm, and can be positioned at a distance 145 of 72.733 mm from the center C of rotor 105. Each corner 307 of the triangular slot 120 can be rounded with a radius of 1.000 mm. Angle β of triangular slot 120, positioned closest to the air gap and stator, can measure 72.81°. The other two angles of triangular slot 120 can be equal such that the triangular slot is substantially an isosceles triangle. A height of the triangular slot 120 from the base 306 to the corner with the value of angle β can be 8.473 mm. Inclusion of the triangular slots 120 in the rotor design as a flux barrier balances the considerations of having enough steel around the triangular slots 120 for flux to travel while providing a lighter rotor. Though FIGS. 1-5 and 6B are depicted with triangular slots 120 formed in each salient pole, another example of the disclosed rotor designs may omit the triangular slots 120 while using the disclosed design of magnet clusters 155 to achieve performance increases over existing designs.

Equally spaced are ten magnetic poles formed by magnet clusters 155. The magnet clusters 155 are designed in a nested-V configuration, also known as a double layer split interior magnet configuration. This configuration includes two angled slots 115A, 115B forming a smaller "v-shape" that is nested within a larger v-shape formed by angled slots 110A, 110C and trapezoidal slot 110B. The long edge of trapezoidal slot 110B positioned closest to the interior circumference of the rotor 105 can be positioned a distance 150 measuring 72.733 mm from the center C of the rotor. The branch 305 of the rotor 105 between magnet slots 110A, 115A can measure 5.217 mm. The branch 308 of the rotor 105 between triangular slot 120 and slot 110A can measure 5.787 mm. The width of these branches, in combination with slot angle θ, reflects a complex tradeoff between wider branches resulting in an increased $L_q/L_d$ ratio, given an appropriate angle, and narrower branches resulting in better utilization and more space for the magnet components.

Though not illustrated for simplicity, a d-axis of the rotor body 105 passes through the center of each trapezoidal slot 110B, along the line of symmetry of each magnet cluster 155. A q-axis of the rotor body 105 passes from the center C through the center of each triangular slot 120.

Table 1 below provides the values for the lengths and radii noted in FIG. 3 for slot 110A. Dimensions for center points noted with a "+" in FIG. 3 refer to the radius of the edge around the center point+. It will be appreciated that slot 110C can be formed having substantially similar dimensions to slot 110A.

TABLE 1

| Reference number | Measurement (mm) |
|---|---|
| 310 | 18.277 |
| 320 | 5.145 |
| 325 | 1.384 |
| 330 | 2.324 |
| 340 | 1.750 |

Table 2 below provides the values for the lengths and radii noted in FIG. 3 for slot 115A. As illustrated, radii centers 303, 302 of slot 115A form magnet retention features in the rotor material on side 365 of slot 115A positioned closer to the inner circumference of the rotor for mechanically supporting a magnet inserted into slot 115A. It will be appreciated that slot 115B can be formed having substantially similar dimensions to slot 115A.

TABLE 2

| Reference number | Measurement (mm) |
|---|---|
| 355 | 5.460 |
| 360 | 4.242 |
| 370 | 8.953 |

Trapezoidal slot 110B and triangular slot 120 may be air gaps or filled with a magnetically inert or low-permeability material, for example injection molded plastic. Though not illustrated in FIGS. 1-3, permanent magnet material can occupy the depth of slot 110A along length 315 and can occupy the depth of slot 115A along length 365.

The configuration of the rotor 105 results in an increase in the $L_q/L_d$ ratio compared to existing nested-v topologies, resulting in higher saliency torque. Saliency increases are one of the most difficult challenges of rotor design. Further, the configuration of slots 110A, 110C, 115A, 115B formed in the rotor 105 enables provision of a greater quantity of magnet material within these slots compared to existing nested-v topologies, resulting in increased flux-linkage and thus higher torque from the magnets. Compared to existing nested-v topologies, the angle of each V-shaped magnet cluster 155 reduces detrimental effects of slotting and the triangular air gaps 120 reduce rotor mass without significantly affecting saliency. Thus, these features of the rotor design, among others, cooperate to yield an increase in power density compared to known designs for this topology.

The depicted rotor magnets are positioned close to the rotor-to-stator air gap. Such positioning and the air pockets at the ends of the magnet slots reduces saturation of the rotor material adjacent to the ends of the magnet slots that could otherwise be a path of flux leakage. A sleeve made of a carbon fiber or other high strength material may alternatively or additionally be utilized around the outer radius of the rotor for increased mechanical strength.

Figure 4:
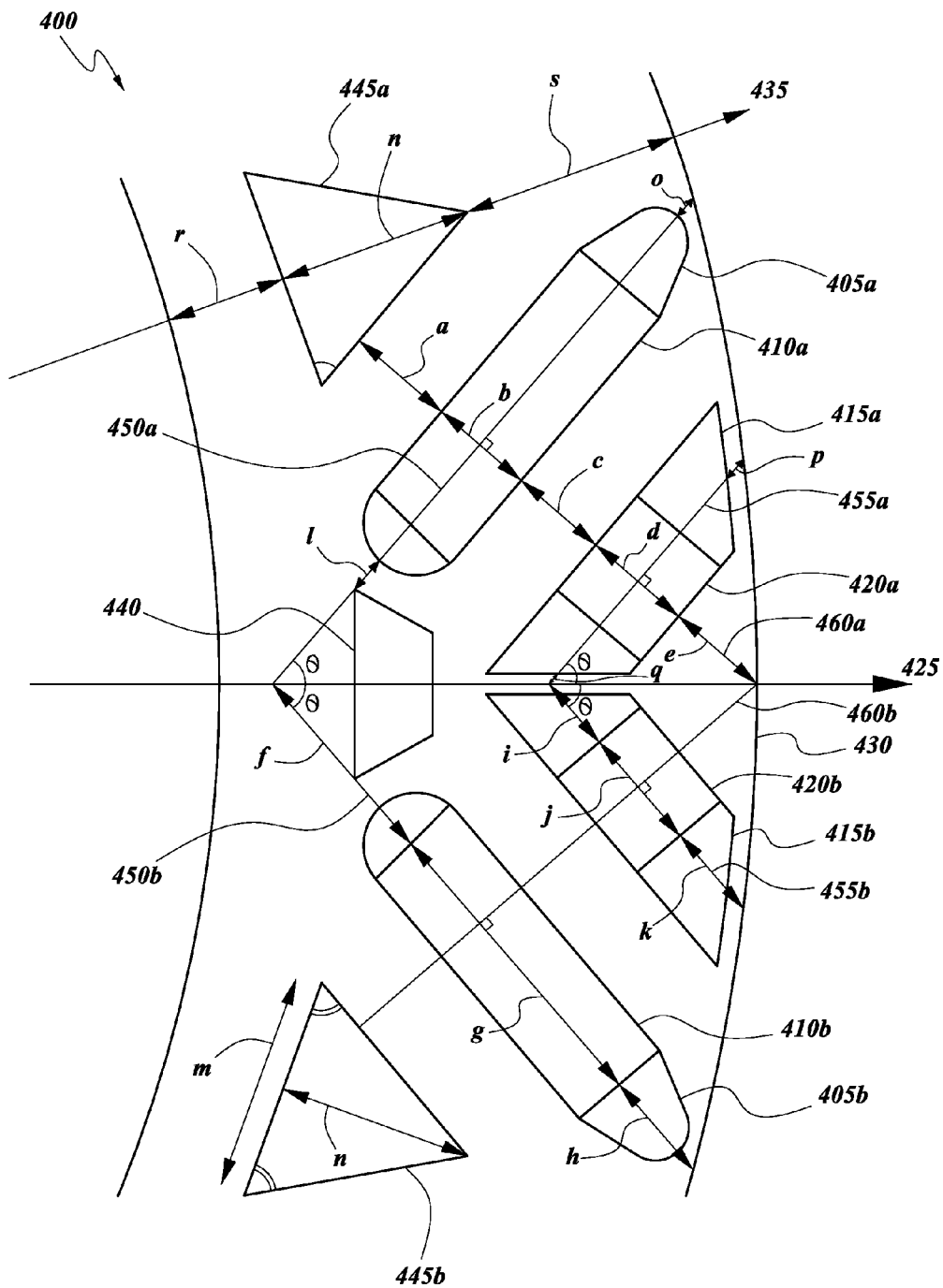
FIG. 4 illustrates an example portion of an IPM rotor having an improved design as described herein.

FIG. 4 illustrates an example portion of an IPM rotor having an improved design as described herein. The specific measurements provided with respect to the design illustrated in FIGS. 1-3 can be constrained, for example, by restrictions on the rotor radius size. However, the principles of the disclosed rotor design can be scaled to rotors of other sizes as discussed in more detail with respect to the relative dimension relationships of FIG. 4.

As described above, a rotor 430 includes slots 405A, 405B, 415A, 415B, and 440 arranged in a nested-V and slots 445A, 445B located adjacent the nested-V slot configuration. Magnet 410A is located in slot 405A, 410B is located in slot 405B, magnet 420A is located in slot 415A, and magnet 420B is located in slot 415B. The magnets 410A, 410B, 420A, 420B and slots 410A, 410B, 415A, 415B, 440, 445A, 445B can have radiused corners instead of sharp corners as depicted. Triangular slots 445A, 445B are positioned on either side of the nested-V.

FIG. 4 illustrates variables a-m for various dimensions of the features of the rotor 430 and slots 405A, 405B, 410A, 410B, 415A, 415B, 440, 445A, 445B. FIG. 4 further illustrates one d-axis 425 and one q-axis 435 of the rotor. The d-axis 425 passes from the center of the rotor (not illustrated) through the center of trapezoidal slot 440, along the line of symmetry of the nested-V magnet cluster. The d-axis 425 refers to the axis of one of the hypothetical stator windings which is aligned with the center of the magnetic poles on which the main magnetic flux due to the rotor 430 flows from rotor 430 through the air-gap into the stator (illustrated in FIGS. 5 and 6B). The q-axis 435 passes from the center of the rotor (not illustrated) through the center of triangular slot 445A. The q-axis 435 refers to the quadrature or interpolar axis that leads the d-axis 280 by 18° in the example 10 pole rotor, passing through the center of the salient pole.

Six lines 450A, 450B, 455A, 455B, 460A, 460B are shown in FIG. 4 for referential purposes, however these lines do not represent physical structures of the rotor. Lines 450A, 450B, 455A, 455B pass along through the center of the depth of a corresponding slot 405A, 405B, 415A, 415B at angle ∂ relative to the d-axis 425. Angle ∂ can have a value of 0.947 radians (54.259 degrees) in one example. Line 460A passes from the point where the d-axis 425 intersects with the outer radius of the rotor 430 to edge of triangular slot 445A perpendicularly to lines 450A and 455A. Line 460B passes from the point where the d-axis 425 intersects with the outer radius of the rotor 430 to edge of triangular slot 445B perpendicularly to lines 450B and 455B. Lines 460A and 460B are used for referencing the thicknesses of rotor branches a, c, e relative to the depths b, d of permanent magnets 410A, 420A. In a rotor dimensioned as shown in FIG. 3, the thickness a can be 5.787 mm and the thickness e can be 4.772 mm. Lines 450A, 450B are used for referencing the width of the magnets 410A, 410B relative to the distance between the d-axis 425 and the edge of the rotor 430 along lines 450A, 450B. Lines 455A, 455B are used for referencing the width of the magnets 420A, 420B relative to the distance between the d-axis 425 and the edge of the rotor 430 along lines 455A, 455B.

As apparent from FIG. 4, the thickness of the rotor branch denoted by l between slot 405A and slot 440 varies due to the curvature of slot 405A and the angled side of trapezoidal slot 440. The denoted thickness l is between the vertex of the curved edge of slot 405A adjacent to slot 440 and the tip of slot 440, and in a rotor dimensioned as shown in FIG. 3, the thickness l can be 1.833 mm.

The thickness of the rotor branch denoted by o between slot 405A and the outer rotor diameter varies due to the curvatures of both the end of slot 405A adjacent rotor branch o and the outer rotor diameter. The denoted thickness o is between the vertex of the curved edge of slot 405A adjacent rotor branch o and a point on the outer rotor diameter located along line 450A passing along the axis of magnet 410A, and in a rotor dimensioned as shown in FIG. 3, the thickness o can be 1.706 mm.

The thickness of the rotor branch denoted by p between slot 415A and the outer rotor diameter varies due to the curvature of the outer rotor diameter. The denoted thickness p is between the vertex of the 405A adjacent rotor branch p and a point on the outer rotor diameter located along line 450A passing along the axis of magnet 410A, and in a rotor dimensioned as shown in FIG. 3, the thickness p can be 1.706 mm.

The thickness of the rotor branch denoted by q between slot 415A and the a point on the d-axis 425 located along line 455A passing along the axis of magnet 420A is a substantially constant thickness, and in a rotor dimensioned as shown in FIG. 3, the thickness q can be 0.613 mm. Thus, the overall thickness of the branch between slots 415A and 415B can be 0.995 mm in some examples.

Table 3 below provides ratios between the depicted variables and the percentage values for the ratios. The size of the bridges having widths denoted by "p" and "o" reflects a complex tradeoff between smaller bridges, which make more effective use of the magnets embedded in the rotor, and larger bridges, which offer more mechanical strength, as well as the interaction of the bridge size with the other design features in terms of effect on rotor performance.

TABLE 3

| Design Feature | Variable Ratio | Most Preferred Value | Preferred Range |
| --- | --- | --- | --- |
| Rotor branch c thickness | c/(b + c + d) | 33.96% | 32-40%, |
| Rotor branch a thickness | a/(a + b + c + d + e) | 21.9% | 17%-26% |
| Rotor branch e thickness | e/(a + b + c + d + e) | 18.1% | 14.5%-22% |

TABLE 3-continued

| Design Feature | Variable Ratio | Most Preferred Value | Preferred Range |
| --- | --- | --- | --- |
| Rotor branch l thickness | l/(f + g + h) | 4.8% | 3.8%-5.8% |
| Rotor branch o thickness | o/(f + g + h) | 4.5% | 3.9%-5.7% |
| Rotor branch p thickness | p/(i + j + k) | 7.6% | 6.1%-9.1% |
| Rotor branch q thickness | q/(i + j + k) | 0.4% | .32%-.48% |
| Magnet 420A, 420B depth:width ratio | j/d | 170% | 150%-190% |
| Magnet 410A, 410B depth:width ratio | g/b | 330% | 315%-345% |
| Magnet 420A, 420B width along line 450A, 450B | j/(i + j + k) | 60% | 55%-65% |
| Magnet 410A, 410B width along line 455A, 455B | g/(f + g + h) | 50% | 45%-60% |
| Triangular slot 445A, 445B dimensions | m/n | 147% | 117%-177% |
| | n/(n + r + s) | 31% | 24%-38% |

The rotor design principles described herein can be implemented using the relationships specified in Table 3 to produce a rotor at any size. It will be appreciated that change in rotor size may affect the performance characteristics relative to the examples discussed below.

Figure 5:
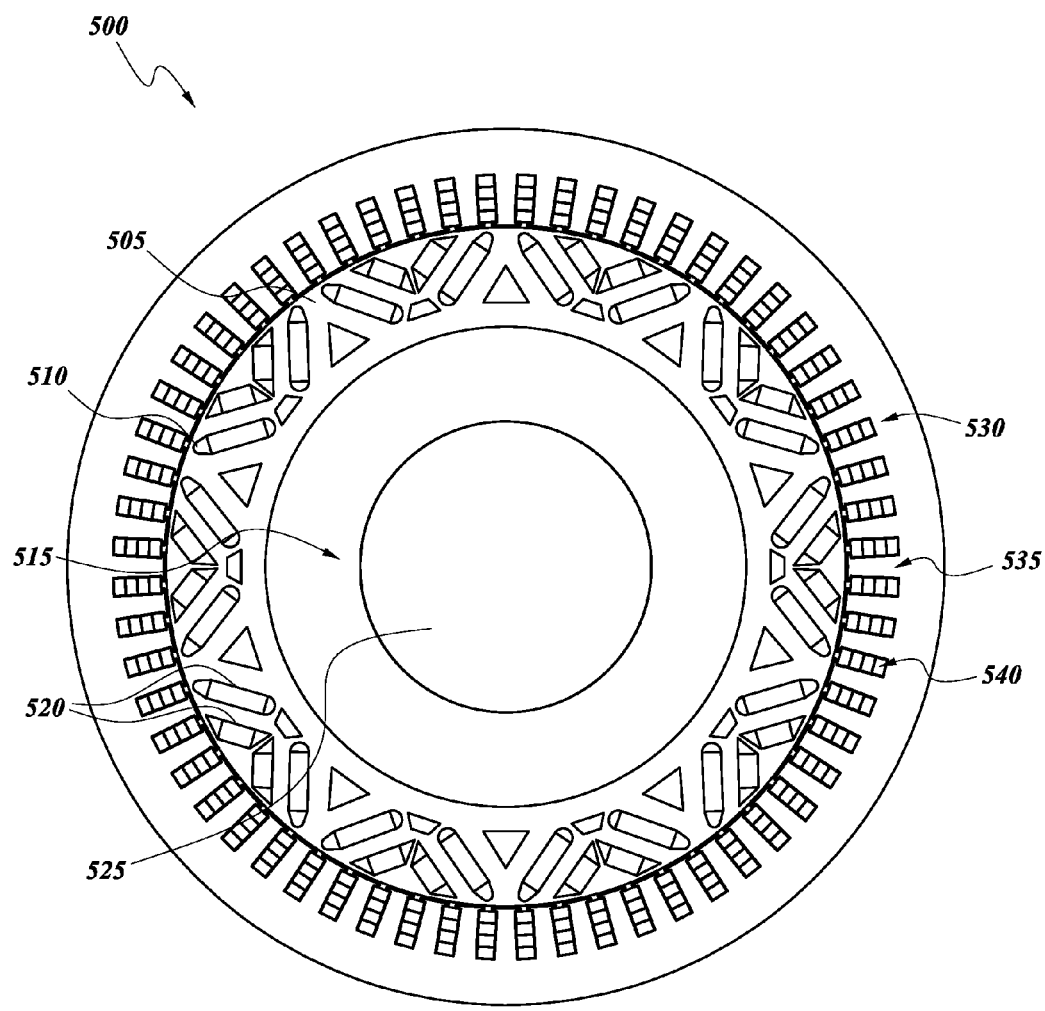
FIG. 5 illustrates an example IPM motor including the rotor design as described herein.

FIG. 5 illustrates an example IPM motor 500 including a rotor designed as described herein. The IPM motor 500 includes a magnetically permeable cylindrically shaped stator assembly having a stator backiron 530 and at least one stator winding (illustrated in slot 540) formed about a plurality of stator teeth 535 separated by slots 540. The stator teeth 535 may contain, at one end, the stator tooth-tips 265, which aid in retaining the stator winding. The stator assembly 530 can be configured to remain stationary. The stator backiron 530 and teeth 535 can be made of a stack of multiple thin layers of electrical steel, for example punched to produce the desired cross-sectional topology, stacked, and laser welded together. The IPM electrical machine 500 also includes an electrical connection (not illustrated) coupled to each stator winding.

A rotor assembly is placed concentrically within the stator assembly. The magnetically permeable rotor 505 is used to conduct magnetic flux. A rotational drive mechanism (an example of which is depicted as inert rotor region 515 and shaft 525) is coupled to the rotor 505 and configured to rotate in association with the rotor 505. Though the rotational drive mechanism is depicted as inert rotor region 515 and shaft 525, other mechanisms can be used to enable rotation of the rotor 505 in other implementations.

The rotor 505 includes a number of slots 510 and permanent magnets 520 designed as described above with respect to FIGS. 1-4. The permanent magnets 520 can have radiused corners, though the depicted example shows sharp corners. Permanent magnets 520 can be made of non-rare earth materials, for example Sr-ferrite and alnico magnetic materials, or rare earth materials. Rare earth materials include neodymium magnets, for example $Nd_2Fe_{14}B$, as well as samarium-cobalt magnets, for example $SmCo_5$, $Sm_2Co_{17}$, $Sm(CoFeCu)_7$, and $Sm(CoFeCuZr)_7$. The foregoing examples are provided as a non-limiting listing of possible permanent magnet materials for some implementations of the disclosed motors, and other suitable permanent magnet materials can be used in other implementations. Conventional materials have an increased risk of demagnetization when the magnets are shaped with longer, narrower form factors as described herein, a problem that is substantially overcome when using the described grades of NdFeB for the permanent magnets. In a preferred embodiment, the permanent magnets 520 can be made from high grade sintered neodymium-iron-boron (NdFeB) magnets having properties similar to the five options listed in Table 4 below.

TABLE 4

| Magnet | Br (typ.) T | HcJ (min) kA/m | Temp. Coef. | |
|---|---|---|---|---|
| | | | a(Br) %/C | a(HcJ) %/C |
| A | 1.21 | 1990 | −0.12 | −0.465 |
| B | 1.35 | 1910 | −0.12 | −0.465 |
| C | 1.22 | 2000 | −0.085 | −0.57 |
| D | 1.31 | 1870 | −0.096 | −0.53 |
| E | 1.23 | 2228 | −0.106 | −0.452 |

The Br values indicate how much torque can be obtained from the magnet. The higher the Br value is, the more magnet torque can be obtained. Hcj values indicate how much field can be applied to a magnet before demagnetization. Higher Hcj values indicate that the more current can be applied to oppose the magnet field without demagnetizing. The aBr values indicate how much magnet torque degrades with temperature, and the aHcJ values indicate how much demagnetization withstand capability degrades with temperature. The preferred magnet materials are able to remain magnetized even when exposed to predicted worst-case field conditions. Further, the preferred magnet materials are able to remain magnetized even when exposed to such high fields during operation at the maximum allowable operating temperatures of the motor.

One embodiment of the rotor 505 can be made of a stack of multiple thin layers of electrical steel, for example punched or laser cut to produce the desired cross-sectional topology, stacked, and laser welded together. In one embodiment, the rotor layers can be steel laminate with insulation and/or adhesive provided on both faces. Generally, the rotor 505 is made of any magnetically permeable material suitable for conducting magnetic flux.

The depicted permanent magnets 520 are positioned close to the rotor-to-stator air gap, the air gap being located between the outer radius of the rotor 505 and the inner radius of the stator teeth 535. Such positioning and the air pockets (or non-permeable filler) at the ends of the magnet slots 510 reduces saturation of the rotor material 505 adjacent to the ends of the magnet slots 510 that could otherwise be a path of flux leakage. The thickness of the material of the rotor 505 between the ends of the magnet slots 510 and the air gap can be selected in some examples to have sufficient mechanical strength to retain the magnets 520 during rotation of the rotor 505. A sleeve made of a carbon fiber or other high strength material may alternatively or additionally be utilized around the outer radius of the rotor for increased mechanical strength, allowing for possible reduction in the thickness of the material of the rotor 505 between the ends of the magnet slots 510 and the air gap.

The gaps or voids in slots 405A, 415A, 405B, 415B that are not filled with permanent magnet material may be filled with a magnetically inert or low-permeability material, for example injection molded plastic.

Overview of Performance Examples

Figure 6A:
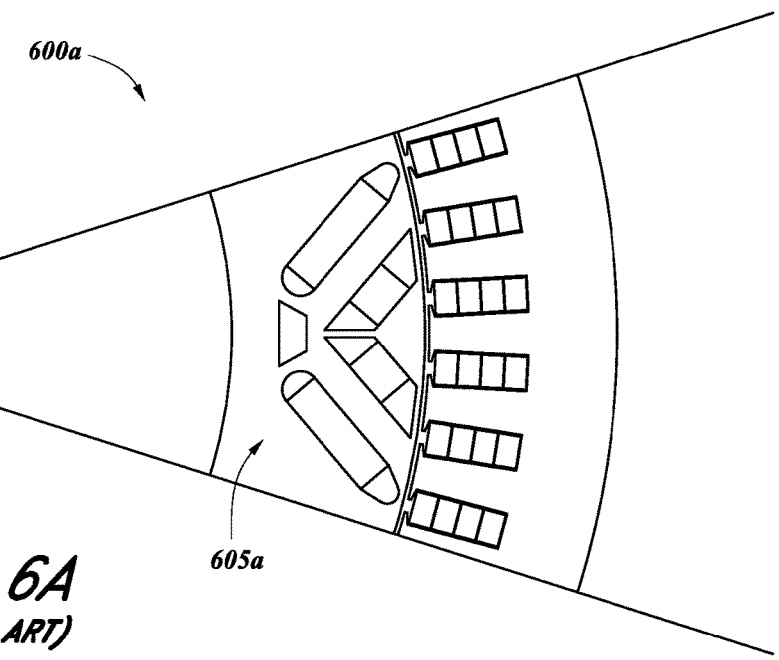
FIG. 6A illustrates a portion of a prior art IPM motor.
Figure 6B:
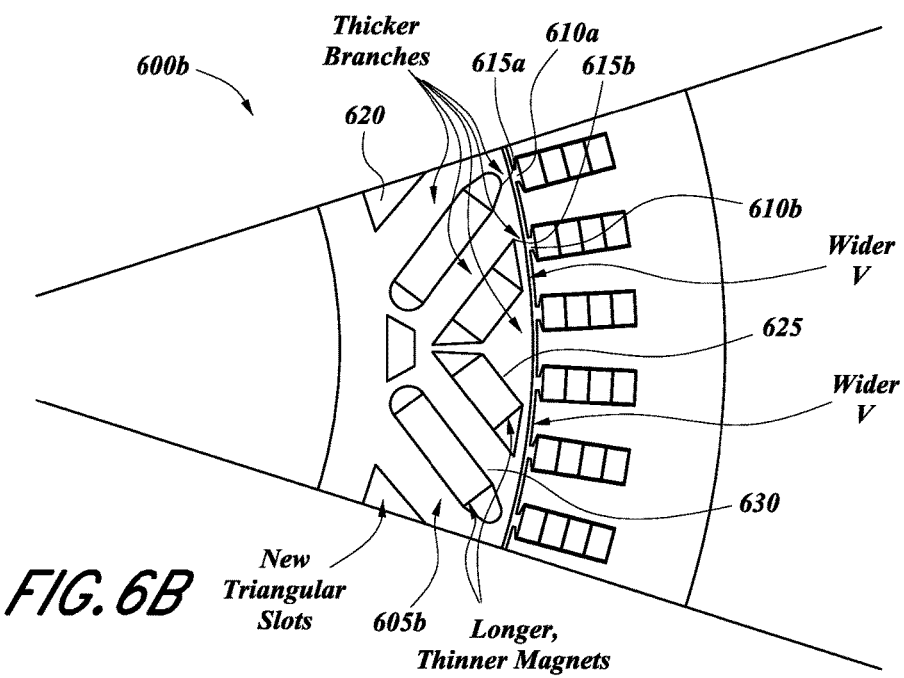
FIG. 6B illustrates a portion of an IPM rotor having an improved design as described herein.

FIG. 6A illustrates a portion 600A of a prior art IPM motor having a topology including a double layer, nested-V 605A permanent magnet placement with known design parameters for the features of the topology. One example of the prior art IPM motor is described in U.S. Pat. No. 7,851,958.

FIG. 6B illustrates a portion 600B of an IPM rotor having a topology including a double layer, nested-V 605B permanent magnet placement having a design as described herein that yields significant performance improvements in comparison to the design of FIG. 6A.

In the design of FIG. 6B the angle of the V has been widened compared to the angle of the V in FIG. 6A. This causes the tip 615A of a first magnet slot in the outer V to be out of alignment with the gap 610A of the stator while the tip 615B of a second magnet slot in the inner V is in alignment with neighboring gap 610B of the stator, reducing detrimental effects due to slotting. In addition, the wider angle increases the thickness of the rotor branches, increasing saliency of the rotor. The slots and enclosed permanent magnets in the design of FIG. 6B have increased width and decreased depth compared to the slots and magnets of FIG. 6A. For example, in the design of FIG. 6B permanent magnet 625 can have a width of 9.757 mm (with width being along the long side of the magnet cross-section) and a depth of 5.237 mm (with depth being along the short side of the magnet cross-section). Permanent magnet 630 can have a width of 18.955 mm and a depth of 4.921 mm in the design of FIG. 6B. This results in a net gain in magnet material in each double-layer nested-V magnet cluster relative to the design of FIG. 6A. The addition of slot 620 reduces mass of the rotor in the design of FIG. 6B relative to the design of FIG. 6A. The increased thickness of the rotor bridges between the tip 615A of a first magnet slot and the air gap and between the tip 615B of a second magnet slot and the air gap allows the motor according to FIG. 6B to be used at 12,000 RPM, while the design of FIG. 6A is only rated for 10,500 RPM, due to the thinner bridges in these areas.

The balance of a variety of rotor and magnet design parameters described herein and as shown in FIG. 6B produces at least four significant features to increase machine performance as compared to known designs as shown in FIG. 6A having a similar topology. These are: (1) the increased thickness of the branches of the rotor steel between adjacent parallel magnets results in an increase in the $L_q/L_d$ ratio, resulting in higher saliency torque of the rotor; (2) the increased magnet material results in increased flux-linkage and therefore torque due to the magnets; (3) the widening of the distance between outermost tips of the slots for the magnets results in the outermost tips of a first half of the magnet slots aligning with the stator teeth at different points in time than the outermost tips of a second half of the magnet slots, effectively reducing the detrimental effects due to slotting including core losses, cogging torque, noise, and reduced harmonics in the open-circuit voltage; and (4) the addition of triangular air gaps in the rotor steel between magnet clusters reduces the mass of the rotor. As described above, widening the v-shape of the magnet slots by the appropriate amount has a number of effects: increasing saliency, allowing flux to disperse, and allowing for wider magnets. In isolation, each of these design changes negatively affects overall motor performance. Further, combinations of some but not all of these changes also negatively impacts overall motor performance. However, in the disclosed combination these design changes produce significant increases in power density, peak power, and maximum torque, as well as a decrease in rotor mass as compared to IPM machines having similar topologies.

Table 5 below shows an example performance comparison for a motor having the known design shown in FIG. 6A and two motors having the rotor designs disclosed herein—a first motor having the design shown in FIG. 6B, but without the triangular slots (these would instead be solid rotor material), and a second motor having the design shown in FIG. 6B. The rotor diameter in the motors in these examples is approximately 186.419 mm.

TABLE 5

| Description | Units | FIG. 6A | FIG. 6B (no triangular slots) | % change from FIG. 6A | FIG. 6B | % change from FIG. 6A |
| --- | --- | --- | --- | --- | --- | --- |
| Peak Power (70 C.) | kW | 185.8 | 215 | 15.70% | 214.5 | 15.40% |
| Max. Torque (0 RPM, 70 C.) | Nm | 438.9 | 482.5 | 9.90% | 479.1 | 9.20% |
| Max. Torque (12000 RPM, 70 C.) | Nm | 111.1 | 151.9 | 36.70% | 151.7 | 36.50% |
| Mass | kg | 26.41 | 26.7 | 1.10% | 25.85 | −2.10% |
| Length | mm | 115.8 | 115.8 | 0.00% | 115.8 | 0.00% |
| Power Density | kW/kg | 7.04 | 8.05 | 14.50% | 8.3 | 18.00% |

As evident from the values in Table 5, the first motor according to the disclosed designs has a power density improvement of 14.5% over existing designs. The second motor according to the disclosed designs has a power density improvement of 18% over existing designs. Table 6 below shows the parameters of the second motor scaled to the maximum torque (between 0 RPM and 70 RPM) of the motor shown in FIG. 6A.

TABLE 6

| Description | Units | FIG. 6B, Scale to FIG. 6A max. torque (438.9 Nm) | % change from FIG. 6A |
| --- | --- | --- | --- |
| Peak Power (70 C) | kW | 214.5 | 15.40% |
| Max. Torque (0 RPM, 70 C) | Nm | 438.9 | 0.0% |
| Max. Torque (12000 RPM, 70 C) | Nm | 156.6 | 41.0% |
| Mass | kg | 23.68 | −10.3% |
| Length | mm | 106.08 | −8.4% |
| Power Density | kW/kg | 9.06 | 28.8% |

Figure 7B:
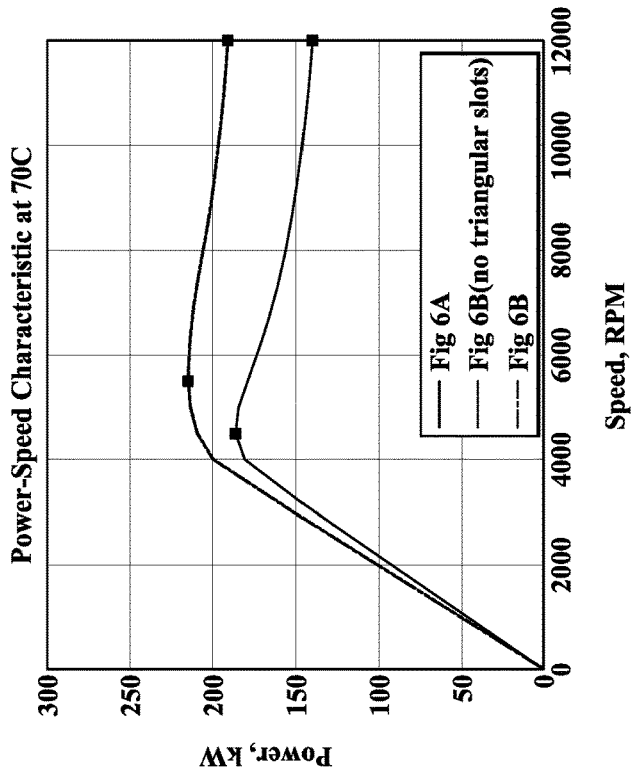
FIGS. 7A and 7B illustrate example performance charts of the prior art rotor design of FIG. 6A compared to the rotor design of FIG. 6B.
Figure 7A:
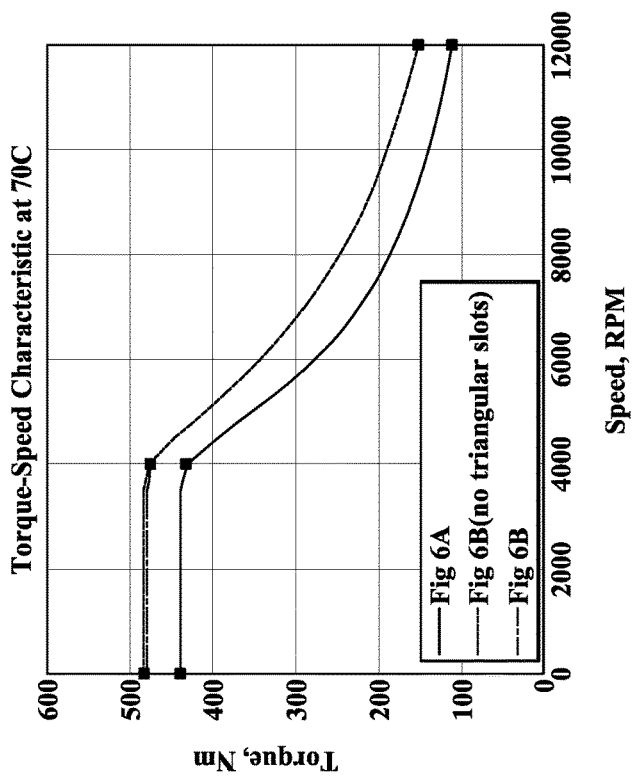

FIGS. 7A and 7B illustrate example performance charts of three motors: (1) a motor having the known rotor design of FIG. 6A, (2) a motor having the rotor design shown in FIG. 6B, but without the triangular slots, and (3) a motor having the rotor design of FIG. 6B. FIG. 7A illustrates torque-speed characteristics 705 of the motors at 70 C as a function of torque (Nm) with respect to speed (RPM). As shown, at 0 RPM the motor with the known rotor design has a torque of 438.9 Nm. At 0 RPM, the two disclosed motors have similar torque values around 482.5 Nm. At 4000 RPM the motor with the known rotor design has a torque of 431.4 Nm. At 4000 RPM, the two disclosed motors have similar torque values around 474.4 Nm.

FIG. 7B illustrates power-speed characteristics 710 of the motors at 70 C as a function of power (Nm) with respected to speed (RPM). As shown, at 4500 RPM the motor with the known rotor design has a peak power of 185.8 kW. At 4500 RPM the two disclosed motors have similar power values around ~210 kW. At 5500 RPM, the two disclosed motors have similar peak power values around 214.5 kW. At 12000 RPM the motor with the known rotor design has a power of 139.6 kW. At 12000 RPM, the two disclosed motors have similar power values around 190.7 kW.

Overview of Example Drive Systems Implementing IPMs

Figure 8:
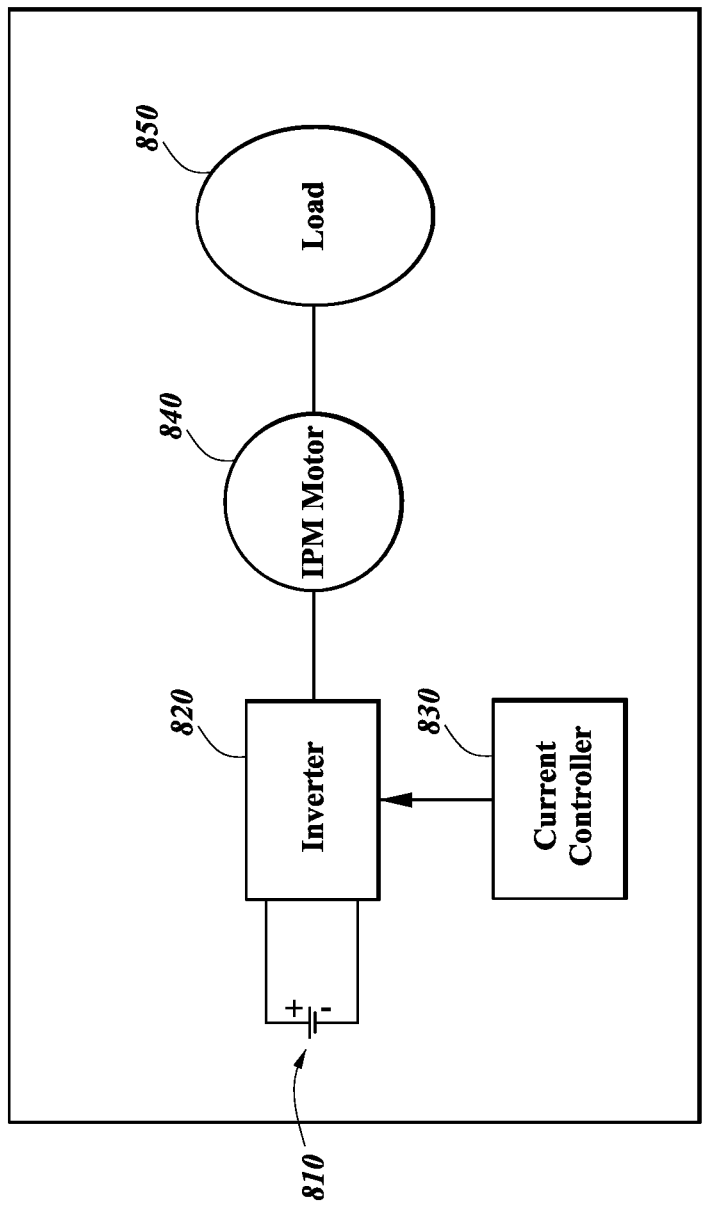
FIG. 8 illustrates a block diagram of an example electric vehicle drive system including an IPM motor as described herein.

FIG. 8 depicts a block diagram of an example electric vehicle drive system 800 including an IPM motor 840 as described herein. The electric vehicle drive system 800 includes a voltage source 810, inverter 820 coupled to the voltage source, current controller 830, IPM motor 840, and load 850. The IPM motor 840 can implement a rotor having one of the designs disclosed herein.

The voltage source 810 is typically a single phase direct current (DC) source; however, single and multi-phase alternating current (AC) outputs are also possible. In some embodiments, voltage source 810 represents a rechargeable electric vehicle battery or traction battery used to power the propulsion of an electric vehicle including the drive system 800.

Inverter 820 includes power inputs which are connected to conductors of the voltage source 810 to receive one of DC power, single-phase electrical current or multi-phase electrical current. Additionally, the inverter 820 includes an input which is coupled to an output of current controller 830, described further below. The inverter 820 also includes three outputs representing three phases with currents that can be separated by 120 electrical degrees, with each phase provided on a conductor coupled to the IPM motor 840. It should be noted that in other embodiments inverter 820 may produce greater or fewer than three phases.

The IPM motor 840 is fed from voltage source inverter 820 controlled by current controller 830. The inputs of IPM motor 840 are coupled to respective windings distributed about a stator. The IPM motor 840 can be coupled to a mechanical output, for example a mechanical coupling between the IPM motor 840 and mechanical load 850. Mechanical load 850 may represent one or more wheels of the electric vehicle.

Controller 830 can be used to generate gate signals for the inverter 820. Accordingly, control of vehicle speed is performed by regulating the voltage or the flow of current from the inverter 820 through the stator of the IPM motor 840. There are many control schemes that can be used in the electric vehicle drive system 800 including current control, voltage control, and direct torque control. Selection of the characteristics of inverter 820 and selection of the control technique of the controller 830 can determine efficacy of the drive system 800.

Although not illustrated, the electric vehicle drive system 800 can include one or more position sensors for determining position of the rotor of IPM motor 840 and providing this information to the controller 830. For example, the IPM motor 840 can include a signal output that can transmit a position of a rotor assembly of the IPM motor 840 with respect to the stator assembly IPM motor 840. The position sensor can be, for example, a hall-effect sensor, potentiometer, linear variable differential transformer, optical encoder, or position resolver. The saliency exhibited by IPM motor 840 can also allow for sensorless control applications. The saliency signature of IPM motor 840 can be strong enough that it can be used to determine rotor position at standstill and low speed operating conditions. Some sensorless designs can use saliency mapping at low speeds and then transition to a back-EMF observer model as the IPM motor 840 speeds up.

Although not illustrated, the electric vehicle drive system 800 can include one or more current sensors for determining phase currents of the stator windings and providing this information to the controller 830. The current sensor can be, for example, a hall-effect current sensor, a sense resistor connected to an amplifier, or a current clamp.

It should be appreciated that while the IPM motor 840 is depicted as an electrical machine that can receive electrical power to produce mechanical power, it can also be used such that it receives mechanical power and thereby converts that to electrical power. In such a configuration, the inverter 820 can be utilized to excite the winding using a proper control and thereafter extract electrical power from the IPM motor 840 while IPM motor 840 is receiving mechanical power.

Implementing Systems and Terminology

Implementations disclosed herein provide design for an interior permanent magnet machine with improved performance.

The systems and methods above have been described in general terms as an aid to understanding details of preferred embodiments of the present invention. Other preferred embodiments of the present include the described application for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An interior permanent magnet electrical machine comprising:
   a stator comprising a plurality of stator teeth separated by a plurality of gaps;
   a rotor positioned within the stator, the rotor comprising:
   a rotor body comprised of magnetically permeable material configured for conducting magnetic flux,
   a plurality of magnet slot clusters, each comprising:
      a plurality of magnet slots formed in the rotor body, the plurality of magnet slots arranged in a first v-shaped configuration nested within a second v-shaped configuration, wherein a d-axis of the rotor passes through a line of symmetry of the first v-shaped configuration and of the second v-shaped configuration,
      a trapezoidal slot formed in the rotor body in a middle portion of the second v-shaped configuration,
      a plurality of branches formed in the rotor body, each branch of the plurality of branches positioned between adjacent magnet slots, the adjacent magnet slots comprising a first magnet slot of the first v-shaped configuration and a second magnet slot of the second v-shaped configuration, wherein a depth of each branch is 32%-40% of a first distance perpendicularly spanning the depth of the first magnet slot, the second magnet slot, and the branch, and a plurality of triangular slots formed in the rotor body, each of the plurality of triangular slots positioned between adjacent magnet slot clusters; and a plurality of permanent magnets, wherein each of the plurality of magnet slots in each of the plurality of magnet slot clusters contains one of the plurality of permanent magnets;

wherein a first magnet of the plurality of permanent magnets in the first magnet slot of the first v-shaped configuration of one of the plurality of magnet slot clusters has a width to depth ratio of 1.5 to 2, and wherein the width of the first magnet is at least 55% of a second distance spanning from the d-axis to an outer circumference of the rotor along a longitudinal axis of the first magnet; and wherein a second magnet of the plurality of magnetized permanent magnets in the second magnet slot of the second v-shaped configuration of the one of the plurality of magnet slot clusters has a width to depth ratio of 3 to 3.5, and wherein the width of the second magnet is at least 45% of a third distance spanning from the d-axis to the outer circumference of the rotor along a longitudinal axis of the second magnet.

2. The interior permanent magnet electrical machine of claim 1, wherein each magnet of the plurality of magnetized permanent magnets is positioned such that a longitudinal axis of the magnet forms an angle of 0.94 radians relative to the d-axis.

3. The interior permanent magnet electrical machine of claim 1, wherein each magnet slot of the plurality of magnet slots includes a magnetically inert material filling ends of the magnet slot on either side of the enclosed one of the plurality of magnetized permanent magnets.

4. The interior permanent magnet electrical machine of claim 1, wherein each magnet slot of the plurality of magnet slots is angled such that a first end of the magnet slot is positioned closer to the stator than a second end of the magnet slot, and wherein the rotor comprises a plurality of additional branches each formed between an outer diameter of the rotor body and the first end of a corresponding one of the plurality of the magnet slots, each of the plurality of additional branches having a thickness between 4.5% and 7.6% of a distance passing through a center of an adjacent slot of the plurality of magnet slots between a d-axis and an outer diameter of the rotor.

5. The interior permanent magnet electrical machine of claim 1, the rotor body further comprising:

an outer rotor branch between an outer diameter of the rotor and an edge of the first magnet slot adjacent the outer diameter of the rotor; and an inner rotor branch between a side of a triangular slot of the plurality of triangular slots adjacent the second magnet slot and an edge of the second magnet slot adjacent the triangular slot.

6. The interior permanent magnet electrical machine of claim 5, wherein a thickness of the outer rotor branch is 14.5%-22% of a second distance perpendicularly spanning the depth of the first magnet slot, the second magnet slot, the branch, the outer rotor branch, and the inner rotor branch.

7. The interior permanent magnet electrical machine of claim 5, wherein a thickness of the inner rotor branch is 17%-26% of a second distance perpendicularly spanning the depth of the first magnet slot, the second magnet slot, the branch, the outer rotor branch, and the inner rotor branch.

8. The interior permanent magnet electrical machine of claim 1, wherein each triangular slot and each trapezoidal slot is filled with a magnetically inert material.

9. The interior permanent magnet electrical machine of claim 1, wherein the plurality of magnet slot clusters comprises ten magnet slot clusters.

10. The interior permanent magnet electrical machine of claim 1, wherein an outer diameter of the rotor is substantially equal to 186.419 mm.

11. The interior permanent magnet electrical machine of claim 10, wherein a cross-sectional area of the first magnet calculated by the width of the first magnet multiplied by the depth of the first magnet is substantially equal to 51 $mm^2$.

12. The interior permanent magnet electrical machine of claim 10, wherein a cross-sectional area of the second magnet calculated by the width of the second magnet multiplied by the depth of the second magnet is substantially equal to 93 $mm^2$.

13. The interior permanent magnet electrical machine of claim 10, wherein each of the plurality of triangular slots comprises an isosceles triangle having a height of 28.5% of a depth of the rotor.

14. An interior permanent magnet electrical machine comprising:

a stator comprising a plurality of stator teeth separated by a plurality of gaps;

a rotor positioned within the stator, the rotor comprising:

a rotor body comprised of magnetically permeable material configured for conducting magnetic flux, a plurality of magnet slot clusters, each comprising:

a plurality of magnet slots formed in the rotor body, the plurality of magnet slots arranged in a first v-shaped configuration nested within a second v-shaped configuration, wherein a d-axis of the rotor passes through a line of symmetry of the first v-shaped configuration and of the second v-shaped configuration, a plurality of branches formed in the rotor body, each branch of the plurality of branches positioned between adjacent magnet slots, the adjacent magnet slots comprising a first magnet slot of the first v-shaped configuration and a second magnet slot the second v-shaped configuration, wherein a thickness of each branch is 32%-40% of a first distance spanning the first magnet slot and the second magnet slot; and a plurality of magnetized permanent magnets, wherein each of the plurality of magnet slots in each of the plurality of magnet slot clusters contains one of the plurality of magnetized permanent magnets, wherein each magnet of the plurality of magnetized permanent magnets is positioned such that a longitudinal axis of the magnet forms an angle of 0.8 to 1.0 radians relative to the d-axis.

15. The interior permanent magnet electrical machine of claim 14, wherein each magnet of the plurality of magnetized permanent magnets is positioned such that the longitudinal axis of the magnet forms an angle of 0.94 radians relative to the d-axis.

16. The interior permanent magnet electrical machine of claim 14, further comprising, between each of the plurality of magnet slot clusters, one of a plurality of triangular air gaps formed in the rotor body.

17. The interior permanent magnet electrical machine of claim 14, wherein a first magnet of the plurality of magnetized permanent magnets in the first magnet slot of the first v-shaped configuration of one of the plurality of magnet slot clusters has a depth to width ratio of 1.7, and wherein the depth of the first magnet is at least 55% of a second distance spanning from the d-axis to an outer circumference of the rotor along a longitudinal axis of the first magnet.

18. The interior permanent magnet electrical machine of claim 17, wherein a second magnet of the plurality of magnetized permanent magnets in the second magnet slot of the second v-shaped configuration of the one of the plurality of magnet slot clusters has a depth to width ratio of 3.3, and wherein the depth of the second magnet is at least 45% of a third distance spanning from the d-axis to the outer circumference of the rotor along a longitudinal axis of the second magnet.

19. The interior permanent magnet electrical machine of claim 14, wherein an outer diameter of the rotor is substantially equal to 186.419 mm.

20. The interior permanent magnet electrical machine of claim 14, wherein a cross-sectional area of the first magnet calculated by the width of the first magnet multiplied by the depth of the first magnet is approximately 51 mm$^2$, and wherein a cross-sectional area of the second magnet calculated by the width of the second magnet multiplied by the depth of the second magnet is substantially equal to 93 mm$^2$.

21. The interior permanent magnet electrical machine of claim 14, wherein each of the plurality of magnet slot clusters further comprises a trapezoidal slot formed in the rotor body in a middle portion of the second v-shaped configuration.

22. The interior permanent magnet electrical machine of claim 14, wherein each magnet slot of the plurality of magnet slots is angled such that a first end of the magnet is positioned closer to the stator than a second end of the magnet.

23. The interior permanent magnet electrical machine of claim 22, wherein first ends of magnet slots in the first v-shaped configuration of the one of the plurality of magnet slot clusters are aligned with corresponding gaps of the plurality of gaps when first ends of magnet slots in the second v-shaped configuration of the one of the plurality of magnet slot clusters are aligned with corresponding teeth of the plurality of stator teeth.

* * * * *